United States Patent
Kacines

(10) Patent No.: US 6,217,670 B1
(45) Date of Patent: Apr. 17, 2001

(54) METHOD OF MANUFACTURING COATED FLUID TUBING

(75) Inventor: Steven C. Kacines, Fort Wayne, IN (US)

(73) Assignee: CF Gomma USA, Inc., Columbia City, IN (US)

( * ) Notice: Subject to any disclaimer, the term of this patent is extended or adjusted under 35 U.S.C. 154(b) by 0 days.

(21) Appl. No.: 09/271,547

(22) Filed: Mar. 18, 1999

Related U.S. Application Data

(60) Provisional application No. 60/114,593, filed on Dec. 31, 1998.

(51) Int. Cl.$^7$ .................. B08B 3/02; B08B 3/04
(52) U.S. Cl. .................. 134/32; 134/33; 134/34; 134/37; 134/38; 134/42; 134/138
(58) Field of Search .................. 134/32, 33, 34, 134/38, 42, 37, 138, 180, 144, 153

(56) References Cited

U.S. PATENT DOCUMENTS

| | | | |
|---|---|---|---|
| 2,653,517 | 9/1953 | Pigott | 90/11 |
| 3,334,639 | 8/1967 | Grant | 134/122 |
| 3,407,099 | 10/1968 | Schell | 148/153 |
| 3,532,014 | 10/1970 | Franz | 83/53 |
| 3,811,347 | 5/1974 | Heckhausen | 83/1 |
| 3,985,848 | 10/1976 | Frische et al. | 264/88 |
| 4,081,892 | 4/1978 | Mercer et al. | 29/421 R |
| 4,552,594 | 11/1985 | van Voskuilen et al. | 134/34 |
| 4,592,698 | 6/1986 | Semp et al. | 414/786 |
| 4,966,059 | 10/1990 | Landeck | 83/53 |
| 5,052,423 | 10/1991 | Chapman et al. | 134/174 |
| 5,092,357 | 3/1992 | Chapman et al. | 134/181 |
| 5,097,731 | 3/1992 | Vives et al. | 83/53 |
| 5,226,973 | 7/1993 | Chapman et al. | 134/34 |
| 5,234,172 | 8/1993 | Chupka et al. | 241/301 |
| 5,265,634 | 11/1993 | Chapman et al. | 134/181 |
| 5,317,794 | 6/1994 | Lerner et al. | 29/426.3 |
| 5,361,791 | 11/1994 | Chapman et al. | 134/122 R |
| 5,458,683 | 10/1995 | Taylor et al. | 118/307 |
| 5,590,691 | * 1/1997 | Iorio et al. | 134/146 |
| 5,605,492 | 2/1997 | Klingel | 451/40 |
| 5,615,696 | 4/1997 | Lawler | 134/104.2 |
| 5,685,053 | 11/1997 | Deonarine et al. | 29/426.4 |
| 5,718,030 | 2/1998 | Langmack et al. | 29/426.3 |
| 5,743,969 | 4/1998 | Lawler | 134/10 |
| 5,849,099 | 12/1998 | McGuire | 134/10 |
| 5,991,995 | 11/1999 | Gabbey | 29/426.4 |

FOREIGN PATENT DOCUMENTS

| | | | |
|---|---|---|---|
| 405285898 | 11/1993 | (JP) | B26F/3/00 |
| 405285899 | 11/1993 | (JP) | B26F/3/00 |

* cited by examiner

*Primary Examiner*—Zeinab El-Arini
(74) *Attorney, Agent, or Firm*—Taylor & Aust, P.C.

(57) ABSTRACT

A method of manufacturing fluid tubing such as fuel or brake tubing utilizes fluid tubing which includes a metal tube with a longitudinal axis, a corrosion resistant metal coating over the metal tube, a binder layer over the metal coating and a plastic coating over the binder layer. A water jet cutter is positioned adjacent to the fluid tubing. The fluid tubing and/or the water jet cutter are moved in a feed direction parallel to the longitudinal axis. The fluid tubing and/or the water jet cutter are rotated about the longitudinal axis. A water jet is jetted from the water jet cutter against the fluid tubing substantially tangentially to the metal tube and at an acute angle to the longitudinal axis, whereby the plastic coating and the binder layer are removed from the fluid tubing and the metal coating remains substantially intact on the metal tube.

22 Claims, 1 Drawing Sheet

METHOD OF MANUFACTURING COATED FLUID TUBING

CROSS REFERENCE TO RELATED APPLICATIONS

This is a non-provisional patent application based upon U.S. provisional patent application serial No. 60/114,593, entitled "SELECTIVE MATERIAL REMOVAL", filed Dec. 31, 1998.

BACKGROUND OF THE INVENTION

1. Field of the Invention

The present invention relates to fluid tubing, and, more particularly, to a method of manufacturing coated fluid tubing such as fuel or brake tubing for use in a motor vehicle.

2. Description of the Related Art

Fluid tubing may be used in known manner to carry pressurized fluid for a specific application. For example, fluid tubing may be used as fuel or brake tubing for use in motor vehicles. Fuel and brake tubing is typically carried on the under carriage of a motor vehicle, and is thus exposed to water and chemicals such as salt, calcium chloride, etc. Accordingly, it is desirable to coat fuel and brake tubing with a metal coating and/or plastic coating to provide improved corrosion resistance and extended life.

Although a plastic coating on the outside of fuel and brake tubing substantially increases the life of the tubing, the plastic also provides manufacturing difficulties which must be overcome. For example, the end of the fuel or brake tubing is connected to another mechanical component in the fuel or brake system which usually requires that the end of the fuel or brake tubing be flared, swedged, beaded, or otherwise formed. The plastic coating must be completely removed from the metal tube prior to the flaring, swedging, beading or other operation. If the plastic is not removed, the metal tube may be damaged and/or the tubing may not properly seal with the connected mechanical component.

It is known to use a laser to remove a plastic coating from the outside of fuel or brake tubing. The power level of the laser is adjusted such that most of the plastic coating is burned off of the fluid tubing while the underlying metal tube remains substantially intact. A problem with using a laser to remove the plastic coating from the metal tube is that the plastic is burned off of the metal tube and leaves a residue layer on the outside of the metal tube. The residue layer may interfere with the sealing of the fluid tubing, and is aesthetically unappealing. Moreover, using a laser to burn the plastic from the outside of a metal tube takes a relatively long period of time which may not be acceptable for mass production items. For example, using a laser to burn the plastic coating from the end of fuel or brake tubing for a distance of slightly less than one inch may require approximately 30 seconds. This is a relatively long period of time for mass production items such as fuel or brake tubing which may not be acceptable.

What is needed in the art is a method of manufacturing fuel or brake tubing so that a predetermined length of the plastic coating can be quickly, easily and cleanly removed from an end of the tubing.

SUMMARY OF THE INVENTION

The present invention provides a method of manufacturing coated fluid tubing, wherein a water jet cutter is used to remove a plastic coating and binder layer without damaging an underlying corrosion resistant metal coating or metal tube.

The invention comprises, in one form thereof, a method of manufacturing fluid tubing such as fuel or brake tubing for use in a motor vehicle. Fluid tubing is provided which includes a metal tube with a longitudinal axis, a corrosion resistant metal coating over the metal tube, a binder layer over the metal coating and a plastic coating over the binder layer. A water jet cutter is positioned adjacent to the fluid tubing. The fluid tubing and/or the water jet cutter are moved in a feed direction parallel to the longitudinal axis. The fluid tubing and/or the water jet cutter are rotated about the longitudinal axis. A water jet is jetted from the water jet cutter against the fluid tubing substantially tangentially to the metal tube and at an acute angle to the longitudinal axis, whereby the plastic coating and the binder layer are removed from the fluid tubing and the metal coating remains substantially intact on the metal tube.

An advantage of the present invention is that the plastic coating and binder layer are removed without damaging the underlying metal coating or metal tube. The cut surface of the plastic coating defines a sharp edge.

Another advantage is that cycle times for each part are very fast relative to conventional techniques.

Yet another advantage is that the jet pressure, jet geometry, jet impingement angle and feed velocity can be varied for different applications.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
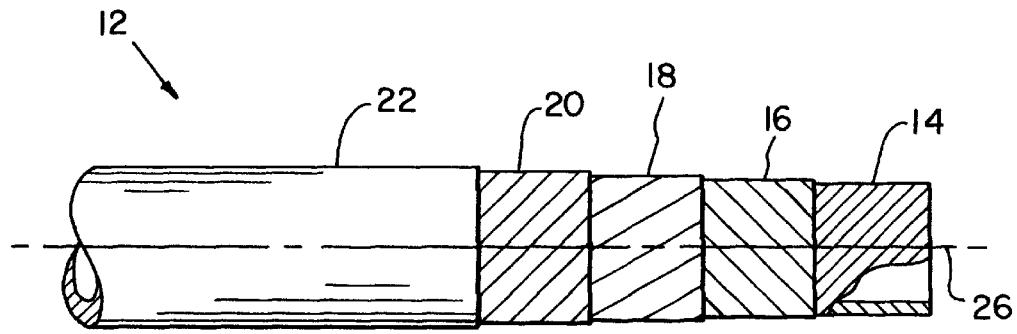
FIG. 1 is a layered, side view of an embodiment of fluid tubing which is manufactured with the method of the present invention.
Figure 2:
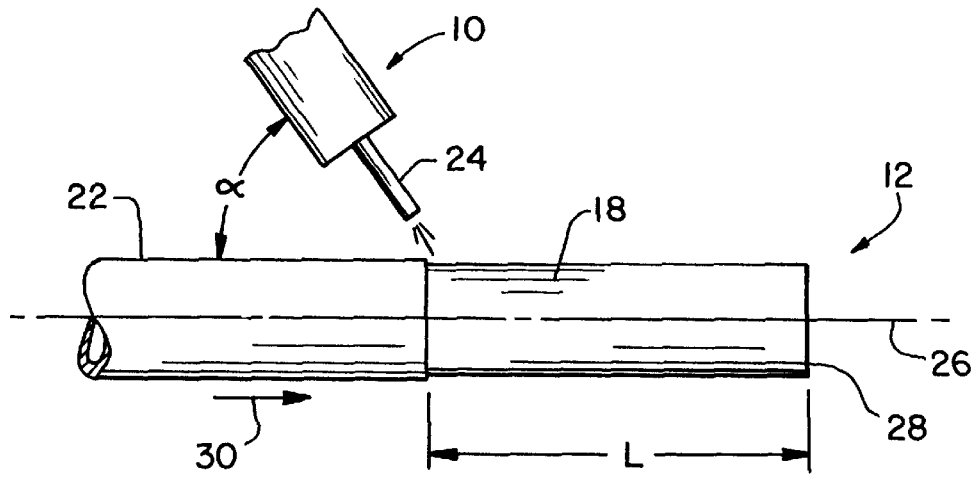
FIG. 2 is a simplified, side view of an embodiment of a water jet cutter positioned adjacent to the fluid tubing of FIG. 1 and used to carry out the method of the present invention.

Referring now to the drawings, a simplified illustration of a water jet cutter 10 (FIG. 2) which is used to carry out an embodiment of the method of the present invention for manufacturing fluid tubing 12 (FIG. 1) will be described. Fluid tubing 12 is manufactured for use as fuel or brake tubing in a motor vehicle in the embodiment shown; however, fluid tubing 12 may be used for other applications as appropriate.

Fluid tubing 12 includes a base metal tube 14, metal plating 16, corrosion resistant metal coating 18, binder layer 20 and plastic coating 22. Metal tube 14 is constructed from steel having a sufficient yield strength, etc., to withstand the fluid pressure and vibrational characteristics of the application with which fluid tubing 12 is used. In the embodiment shown, metal tube 14 is constructed from low carbon mild steel.

Metal plating 16 and metal coating 18 successively overly metal tube 14 and provide a corrosion resistant metal layer over metal tube 14. In the embodiment shown, metal plating 16 is in the form of copper plating which is electroplated onto metal tube 14. A portion of metal coating 18 is exposed to an ambient environment (as will be described in further detail hereinafter) and thus provides the primary corrosion resistant coating overlying an exposed end of metal tube 14. In the embodiment shown, metal coating 18 is in the form of a zinc/aluminum mischmetal alloy with a consistency of approximately 95% zinc and 5% aluminum. Metal coating 18 is applied over metal plating 16 using a hot dip coating method with a thickness of between approximately 10 and 15 micrometers.

Binder layer 20 adhesively bonds plastic coating 22 to metal coating 18. Binder layer 20 may be formed from any suitable binder material. In the embodiment shown, binder layer 20 is applied over the outside of metal coating 18 with an average thickness of approximately 3.5 micrometers.

Plastic layer 22 provides the primary corrosion resistance over the majority of the length of fluid tubing 12. Plastic coating 22 may be in the form of any suitable plastic and can be applied to the outside of metal coating 18 with any convenient method such as extrusion or hot dip coating. In the embodiment shown, plastic coating 22 is in the form of polyamide (Nylon 12 (™)) which is extruded over binder layer 20 with a thickness of between approximately 170 and 202 micrometers.

When constructed as shown, the copper plated base metal tube consisting of metal tube 14 and metal plating 16 has an outside diameter of approximately 4.76 millimeters and the final outside diameter of plastic coating 22 is approximately 5.16 millimeters. Of course, the specific dimensions, coating thicknesses and tolerances of fluid tubing 12 can vary from one application to another.

Water jet cutter 10 jets water from a nozzle 24. The pressure of the water which is jetted from nozzle 24 and the exit diameter of nozzle 24 primarily define the flow velocity of the water which is jetted against fluid tubing 12. In the embodiment shown, the water is jetted from nozzle 24 at a pressure of between 10,000 and 25,000 pounds per square inch (psi), and more preferably at a pressure of between 22,500 and 23,000 psi. Moreover, in the embodiment shown, nozzle 24 has an exit diameter of between approximately 0.12 and 0.76 millimeters, and preferably is approximately 0.45 millimeters. It has been found that placing nozzle 24 relatively close to fluid tubing 12 and jetting water from nozzle 24 within these fluid pressure and exit diameter ranges is sufficient to remove substantially all of plastic coating 22 and binder layer 20 without removing metal coating 18, metal plating 16 or metal tube 14.

Water cutter 10 is also placed at an angle α relative to longitudinal axis 26 of fluid tubing 12 so that the water impinges upon metal coating 18 in a particular direction. As will be described in more detail hereinafter, a specified length L of plastic coating 22 and binder layer 20 are removed from an end 28 of fluid tubing 12 using water jet cutter 10. By directing the jet of water at an acute angle α relative to longitudinal axis 26 and toward end 28, the water is substantially prevented from flowing in a direction opposite from end 28 and thereby removing additional plastic coating 22 and binder layer 20. In the embodiment shown, water jet cutter 10 jets a water stream from nozzle 24 at an acute angle α which is between 45 and 89°, preferably is between 70 and 80°, and more preferably is approximately 80°.

Figure 3:
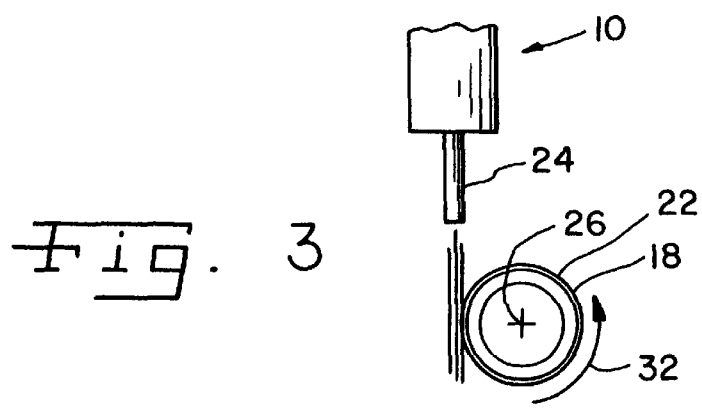
FIG. 3 is an end view of the water jet cutter and fluid tubing shown in FIG. 2.

During manufacture, metal coating 18, binder layer 20 and plastic layer 22 are applied to the outside of the copper plated base metal tube consisting of metal plating 16 and metal tube 14. Metal tube 14 is normally purchased with copper plating 16 already applied thereto. Metal tube 14 may also be purchased with metal coating 18, binder layer 20 and plastic coating 22 applied to copper plated metal tube 14, 16. Fluid tubing 12 is positioned relative to nozzle 24 of water jet cutter 10 at a distance which allows plastic coating 22 and binder layer 20 to be removed from fluid tubing 12. The exact distance between nozzle 24 and fluid tubing 12 may be easily empirically determined, and generally is a distance such that the geometry of the water jet exiting nozzle 24 does not substantially change before impacting plastic layer 22. Water jet cutter 10 is positioned at an angle α relative to longitudinal axis 26 of fluid tubing 12 which is approximately 80°. Moreover, water jet cutter 10 is positioned relative to fluid tubing 12 such that the water jet impinges upon plastic coating 22 substantially tangentially to metal tube 14, copper plating 16 and zinc/aluminum coating 18 (FIG. 3). Initially, the water jet from water jet cutter 10 does not impinge upon fluid tubing 12 (i.e., to the right of end 28 shown in FIG. 2). Fluid tubing 12 is then moved in a feed direction 30 which is generally parallel to longitudinal axis 26, and is simultaneously rotated about longitudinal axis 26 as indicated by rotational arrow 32. The rate of feed of fluid tubing 12 and the rotational speed of fluid tubing 12 may be easily empirically determined. In the embodiment shown, the rate of feed is approximately 25 mm/sec and the rotational speed is approximately 360 RPM. As fluid tubing 12 moves in feed direction 30, the water jet which is jetted from nozzle 24 of water jet cutter 10 removes plastic layer 22 and binder layer 20 from fluid tubing 12 while zinc/aluminum coating 18, copper plating 16 and base metal tube 14 remain substantially intact. Fluid tubing 12 is moved in feed direction 30 a distance L such that a specified length of plastic coating 22 and binder layer 20 are removed from fluid tubing 12. By placing water jet cutter 10 at an angle α of approximately 80° relative to longitudinal axis 26, additional plastic coating 22 is not removed beyond length L. Movement of fluid tubing 12 in feed direction 30 may be stopped or the water jet may be turned off when length L of plastic coating 22 has been removed from end 28 of fluid tubing 12. Fluid tubing 12 is then moved away from water jet cutter 10 and further processed for a specific application. For example, end 28 of fluid tubing 12 may be flared, swedged or beaded to allow fluid tubing 12 to be connected with an end connector or other suitable components.

The method of removing a length L of plastic coating 22 and binder layer 20 from fluid tubing 12 as described above provides much faster and cleaner removal of plastic layer 22 and binder layer 20 than heretofore possible. In the embodiment shown, length L may correspond to a length of approximately 20 millimeters. It has been found that plastic coating 22 and binder layer 20 may be removed from fluid tubing 12 using the method of the present invention as described above in a time period of approximately 6 seconds, but may be as fast as 2 seconds. This is much faster than heretofore possible using lasers or abrasive wire brushes. For example, a laser cutter may typically require about 30 seconds to remove plastic coating 22 from fluid tubing 12. Additionally, a laser cutter leaves a glaze of residue on the outside of zinc/aluminum coating 18 as a result of melting plastic layer 22. The method of the present invention utilizing water jet cutter 10 therefore provides a much faster and cleaner removal of plastic layer 22 and binder layer 20 from fluid tubing 12.

The method of the present invention as described above may be carried out in a continuous or batch manner. That is, fluid tubing 12 may be fed in a continuous manner past water jet cutter 10 to remove plastic coating 22 and binder layer 20 at specified locations along the length of fluid tubing 12. Fluid tubing 12 may then be cut on the downstream side of water jet cutter 10 (relative to feed direction 30) to separate fluid tubing 12 into different lengths for use in a particular application. For example, fluid tubing 12 may be cut into discrete pieces on the downstream side of water jet cutter 10 using a laser cutter, water jet cutter or mechanical cutter. Alternatively, individual, discrete pieces of fluid tubing 12 may be processed to remove plastic coating 22 and binder layer 20 using water jet cutter 10 in a batch manner.

In the embodiment shown and described above, water jet cutter 10 remains stationary and fluid tubing 12 is moved in feed direction 30 and rotational direction 32. However, it is also to be understood that fluid tubing 12 may remain stationary while water jet cutter 10 moves in a transnational direction parallel to longitudinal axis 26 and/or rotates about longitudinal axis 26. Moreover, water jet cutter 10 may include more than one nozzle 24 from which a water jet is jetted against fluid tubing 12, with either fluid tubing 12 and/or the nozzles 24 moving in a translational and/or rotational direction.

Additionally, in the embodiment shown, water jet cutter 10 jets water against fluid tubing 12 to remove plastic layer 22 and binder layer 20. However, the water which is jetted against fluid tubing 12 may also include abrasive particles therein for enhancing removal of plastic layer 22 and binder layer 20. Of course, the pressure of the water within nozzle 24 and the exit diameter of nozzle 24 may need to be varied if abrasives are carried within the water. Additionally, water jet cutter 10 need not necessarily jet a supply of water against fluid tubing 12, but may also jet a supply of a different cutting fluid against fluid tubing 12.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of processing fluid tubing, comprising the steps of:
   providing fluid tubing including a metal tube with a longitudinal axis, a corrosion resistant metal coating over said metal tube, and a plastic coating over said metal coating;
   positioning a water jet cutter adjacent said fluid tubing; and
   jetting a water jet from said water jet cutter against said fluid tubing substantially tangentially to said metal tube and at an acute angle to said longitudinal axis, thereby removing said plastic coating from said fluid tubing and leaving said metal coating substantially intact on said metal tube.

2. The method of claim 1, comprising the further step of moving one of said fluid tubing and said water jet cutter in a feed direction parallel to said longitudinal axis.

3. The method of claim 2, wherein said moving step comprises moving said fluid tubing in said feed direction.

4. The method of claim 2, wherein said jetting step comprises jetting said water jet against said fluid tubing at an acute angle to said feed direction.

5. The method of claim 4, wherein said acute angle is between 45 and 89 degrees.

6. The method of claim 5, wherein said acute angle is between 70 and 80 degrees.

7. The method of claim 6, wherein said acute angle is approximately 80 degrees.

8. The method of claim 1, comprising the further step of rotating at least one of said fluid tubing and said water jet cutter about said longitudinal axis.

9. The method of claim 8, wherein said rotating step comprises rotating said fluid tubing about said longitudinal axis.

10. The method of claim 1, wherein said water jet cutter includes a nozzle, and wherein said jetting step comprises jetting said water jet from said nozzle at a pressure of between 10,000 and 25,000 pounds per square inch.

11. The method of claim 10, wherein said jetting step comprises jetting said water jet from said nozzle at a pressure of between 22,500 and 23,000 pounds per square inch.

12. The method of claim 10, wherein said nozzle has an exit diameter of between approximately 0.12 and 0.76 millimeters.

13. The method of claim 12, wherein said nozzle has an exit diameter of approximately 0.45 millimeters.

14. The method of claim 1, wherein said metal coating consists essentially of a zinc/aluminum mischmetal alloy.

15. The method of claim 14, wherein said metal coating has a thickness of between approximately 10 and 15 micrometers.

16. The method of claim 1, wherein said plastic coating consists essentially of polyamide.

17. The method of claim 16, wherein said plastic coating has a thickness of between approximately 170 and 202 micrometers.

18. The method of claim 1, wherein said fluid tubing further includes a binder layer between said metal coating and said plastic coating, and wherein said jetting step comprises removing each of said plastic coating and said binder layer from said fluid tubing while said metal coating remains substantially intact on said metal tube.

19. The method of claim 18, wherein said binder layer has a thickness of approximately 3.5 micrometers.

20. The method of claim 1, wherein said fluid tubing comprises one of fuel and brake tubing for use in a motor vehicle.

21. A method of processing fluid tubing, comprising the steps of:
   providing fluid tubing including a metal tube with a longitudinal axis, a corrosion resistant metal coating over said metal tube, a binder layer over said metal coating and a plastic coating over said binder layer;
   positioning a water jet cutter adjacent said fluid tubing;
   moving one of said fluid tubing and said water jet cutter in a feed direction parallel to said longitudinal axis;
   rotating one of said fluid tubing and said water jet cutter about said longitudinal axis; and
   jetting a water jet from said water jet cutter against said fluid tubing substantially tangentially to said metal tube and at an acute angle to said longitudinal axis, thereby removing said plastic coating and said binder layer from said fluid tubing and leaving said metal coating substantially intact on said metal tube.

22. A method of processing fluid tubing, comprising the steps of:

providing fluid tubing including a metal tube with a longitudinal axis, a corrosion resistant metal coating over said metal tube, and a plastic coating over said metal coating;

positioning a fluid jet cutter adjacent said fluid tubing; and jetting a fluid jet from said fluid jet cutter against said fluid tubing substantially tangentially to said metal tube and at an acute angle to said longitudinal axis, thereby removing said plastic coating from said fluid tubing and leaving said metal coating substantially intact on said metal tube.

* * * * *